United States Patent
Choi et al.

(10) Patent No.: US 11,019,250 B2
(45) Date of Patent: May 25, 2021

(54) METHOD FOR IMPLEMENTING ANIMAL NOSE PATTERN BIOMETRIC IDENTIFICATION SYSTEM ON MOBILE DEVICES

(71) Applicant: ISCILAB CORPORATION, Seoul (KR)

(72) Inventors: Stephanie Sujin Choi, Seoul (KR); Hyeong In Choi, Seoul (KR)

(73) Assignee: ISCILAB CORPORATION, Seoul (KR)

( * ) Notice: Subject to any disclaimer, the term of this patent is extended or adjusted under 35 U.S.C. 154(b) by 275 days.

(21) Appl. No.: 16/357,758

(22) Filed: Mar. 19, 2019

(65) Prior Publication Data
US 2019/0297252 A1  Sep. 26, 2019

Related U.S. Application Data

(60) Provisional application No. 62/645,253, filed on Mar. 20, 2018.

(51) Int. Cl.
   *G06K 9/00* (2006.01)
   *H04N 5/232* (2006.01)
   (Continued)

(52) U.S. Cl.
   CPC ..... *H04N 5/23218* (2018.08); *G06K 9/00362* (2013.01); *G06K 9/3233* (2013.01);
   (Continued)

(58) Field of Classification Search
   CPC .......... G06T 19/20; G06T 2219/2012; G06T 2207/30201; G06T 11/60; G06T 7/73; G06T 7/70; G06T 19/006; G06T 13/40; G06T 2207/10016; G06T 2219/2021; G06T 7/246; G06T 7/74; G06T 2200/24; G06T 13/80; G06T 1/0007; G06T 2207/30244;
   (Continued)

(56) References Cited

U.S. PATENT DOCUMENTS

| | | | |
|---|---|---|---|
| 2013/0258118 A1* | 10/2013 | Felt | H04N 17/002 348/207.1 |
| 2015/0078626 A1* | 3/2015 | Kinard | G06K 9/00617 382/110 |

(Continued)

OTHER PUBLICATIONS

M. Bertalmio et al., "Navier-stokes, fluid dynamics, and image and video inpainting." In Computer Vision and Pattern Recognition, 2001. CVPR 2001. Proceedings of the 2001 IEEE Computer Society Conference on, vol. 1, pp. I-355. IEEE, 2001.

(Continued)

*Primary Examiner* — Alex Kok S Liew
(74) *Attorney, Agent, or Firm* — LRK Patent Law Firm

(57) ABSTRACT

A method for implementing animal nose pattern biometric identification system on a mobile device using visual guides displayed on a screen to position a camera in relation to a nose. Suitable types and sizes of visual guides are selected for each animal nose and are superimposed on the perimeter of the nose or features of the nose that are displayed on the screen through the camera. The visual guides help define areas for autofocusing and real-time or post-acquisition image quality assessment, as well as the region of interest used for biometric matching.

20 Claims, 4 Drawing Sheets

(51) Int. Cl.
*G06K 9/32* (2006.01)
*H04B 1/3827* (2015.01)

(52) U.S. Cl.
CPC ... *H04N 5/23222* (2013.01); *H04N 5/232127* (2018.08); *H04N 5/232945* (2018.08); *H04B 1/3827* (2013.01)

(58) Field of Classification Search
CPC ............. G06T 2219/2016; G06T 7/251; G06T 11/001; G06T 2207/10004; G06K 9/00255; G06K 9/00275; G06K 9/00288; G06K 9/00228; G06K 9/00281; G06K 9/00362; G06K 9/0061; G06K 9/00268; G06K 9/00315; G06K 9/00912; G06K 9/00248; G06K 9/00308; G06K 9/00355; G06K 9/00382; G06K 9/00389
See application file for complete search history.

(56) References Cited

U.S. PATENT DOCUMENTS

| | | | |
|---|---|---|---|
| 2016/0110383 A1* | 4/2016 | Mowry | G06F 16/583 707/758 |
| 2016/0148384 A1* | 5/2016 | Bud | H04N 5/23293 348/207.11 |

OTHER PUBLICATIONS

Alexandru Telea, "An image inpainting technique based on the fast marching method." Journal of graphics tools, vol. 9, No. 1, pp. 25-36, 2004.

* cited by examiner (a)

(b)

(c)

(d)

(e)

(a)

(b)

(a)

(b)

METHOD FOR IMPLEMENTING ANIMAL NOSE PATTERN BIOMETRIC IDENTIFICATION SYSTEM ON MOBILE DEVICES

CROSS REFERENCE TO RELATED APPLICATION

This application claims the benefit of U.S. Provisional Application No. 62/645,253, filed Mar. 20, 2018, the disclosure of which is incorporated by reference in its entirety herein.

BACKGROUND OF THE INVENTION

1. Field of the Invention

The present invention relates to a method of capturing photographic images of animal nose patterns for the purpose of biometric identification on mobile devices.

2. Description of Related Art

It is known that the nose pattern of certain animals—almost all species belonging to the Ruminantia, Caniformia, and Feliformia suborders—is unique to each individual, just as the fingerprint pattern is unique to each individual human being. Thus there have been attempts to utilize the uniqueness of nose patterns to develop an animal nose pattern recognition system.

There are endless applications for animal biometric identification, but the most impactful, practical, and crucial implementation of the technology is in the integration to mobile devices and cloud service.

For the average user, going to designated offices or purchasing specialized equipment to make use of the nose pattern biometric recognition technology is an inconvenient and possibly prohibitive barrier. However, this type of community-based technology is only truly useful when there is a large and active user base, which mandates accessibility, as well as ease of use and connectivity. Since everyone has mobile devices these days, and these devices generally come equipped with an embedded rear-facing camera, they are the ideal medium for delivering the animal biometrics identification (ID) technology to the average user.

Realistically, image acquisition has to be easy and the integration of the matching service has to be fast and seamless. There is some room for flexibility with regards to where the nose pattern enrollment database and matching algorithm are stored, as well as where the biometric matching computation occurs. However, as mobile device cameras are not designed with the specific task of nose print biometric recognition in mind, the implementation requires a creative methodology with the aid of specially designed additional software. The present invention discloses such a method.

SUMMARY OF THE INVENTION

A method for implementing animal nose pattern biometric identification system on mobile devices, such as smart phones and tablets, is provided. The method for implementing animal nose pattern biometric identification system on mobile devices comprises aiming an embedded camera on the mobile device at the nose using visual guides displayed on a screen of the mobile device, superimposing the visual guides on the screen over a perimeter of the nose or features of the nose displayed on the screen through the camera, and capturing resulting animal nose pattern images with the camera, wherein the visual guides are used to acquire good quality nose pattern images for biometric identification.

Nose pattern images are captured using the embedded camera of the mobile device with the help of visual guides displayed on the screen. Maneuvering the relative position of the mobile device to the animal nose so that the visual guides appear superimposed on the nose features in the capture screen enables the acquisition of consistently good quality nose pattern images. Visual guides can vary in shapes and sizes to accommodate the shape, size, and proportions of a particular animal.

Visual guides can simplify setting the boundaries to the Regions of Interest (ROI) for nose pattern recognition utilizing the visual guides, wherein the ROI is an area within the image that is used for biometric identification, by providing landmarks relative to which the ROI is defined.

Visual guides also help define the area that is used for autofocus as well as image quality assessment, both real-time and post-acquisition. The criteria for image quality assessment may include focus (sharpness), specular reflection, occlusion, angular distortion, etc. When the quality of acquired images do not meet predetermined standards, the operator is alerted to try again for better results.

Acquired nose pattern images are then enrolled in the database or matched with previously enrolled nose IDs. Storing and matching the nose pattern images may occur on the local mobile device or on the cloud. Also, the nose pattern images may be enhanced or be used to generate nose codes before matching or enrollment.

BRIEF DESCRIPTION OF THE DRAWINGS

While the specification concludes with claims particularly pointing out and distinctively claiming the subject matter of the present invention, it is believed the invention will be more clearly understood from the following detailed description taken in conjunction with the accompanying drawings, wherein:

DETAILED DESCRIPTION OF THE INVENTION

Figure 1:
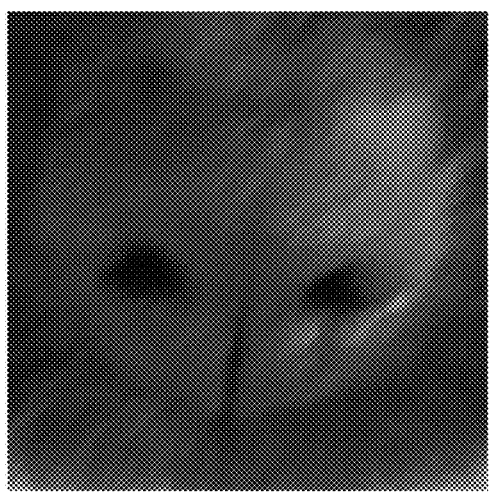
FIG. 1 shows nose pattern images with different problems.
Figure 1:
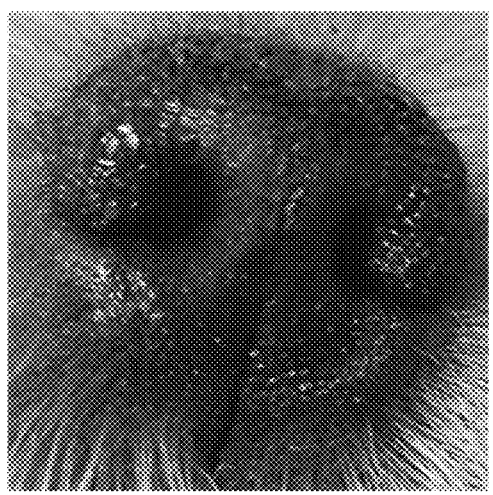
Figure 1:
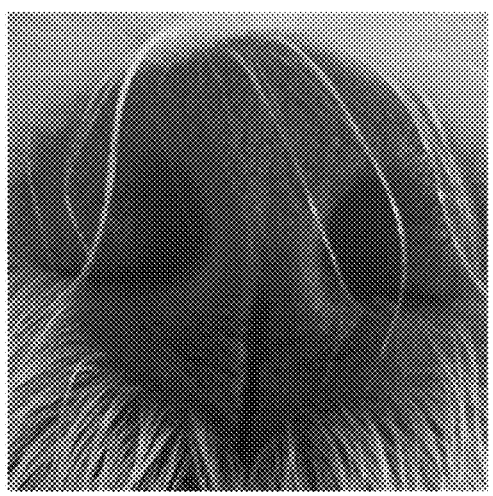
Figure 1:
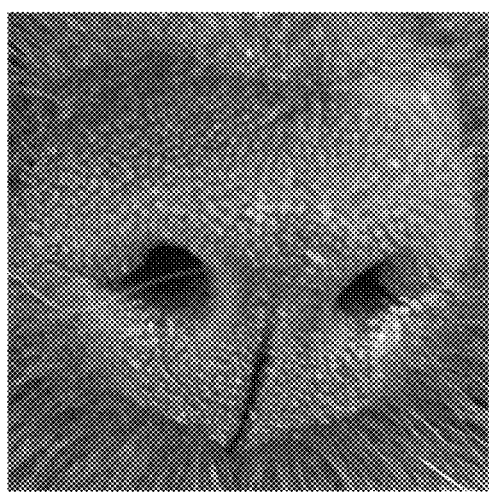
Figure 1:

In the following description, numerous specific details are set forth. However, it is to be understood that any reasonable variations of the embodiments of the invention that retain the core concept should be considered within the scope of the present disclosure.

The meaning of specific terms of words used in the following sections should not be limited to the literal or commonly employed sense, but should be interpreted within the appropriate context. For instance, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The implementation of any biometric identification technology begins with the acquisition of the particular biometric data. In this case it is the animal nose pattern image, for which there are basically two different approaches: contact type and non-contact type.

The contact type method obtains nose images either by the application of a pigment onto the nose for a contact impression print, or by using a capacitive touch sensor as used for fingerprints. The ink impression method has been used for a long time in places like Japan to identify cows, yet not only is it a rather cumbersome and delicate process that requires skill, but also impractical and inaccurate for an animal with a small nose. Moreover, the contact method runs the risk of creating distorted impressions from applying too much or uneven pressure onto the nose.

The more recent, non-contact approach is to use cameras to take pictures of the nose at a reasonably close distance. Whereas the non-contact method of nose pattern image acquisition is superior to the various contact methods in terms of hygiene, convenience and rendition accuracy, it is not inherently without obstacles.

The animal nose has an intertwining pattern of beads (extruding-out parts) and grooves (valleys between beads). When the nose image is taken with a camera, the grooves typically become darker whereas the beads are brighter.

The most reliable way of capturing high quality nose pattern images for biometric identification is by using a dedicated camera system suited for the purpose. However it may be an impractical option for an average user as it requires special dedicated camera and hardware. On the other hand, mobile devices such as smart phones and tablets with built-in cameras present a very convenient and economical alternative. When coupled with specially made mobile applications, there are a lot of advantages to using these mobile devices over dedicated systems: no need for an average consumer or pet owner to visit a specialized office; cheapest mass deployment; and ubiquitous presence, as anyone at any time can make use of the technology.

Mobile device cameras nowadays are high-functioning on their own, and are meant to accommodate all the typical photographic situations of the average user. While independent camera devices, like digital single-lens reflex cameras (DSLR), are easily modifiable with interchangeable parts to fit the subject and circumstances, a mobile device camera is more of a one-size-fits-all deal despite certain limitations.

As a result, consistently capturing adequate nose pattern images on bare mobile phone camera is not simple. There are issues with: macro capability, reflections, focus, and aim. The cameras on most current mobile devices alone are capable of capturing nose images with discernible patterns in high enough resolution, but not consistently in the form necessary for accurate biometric pattern recognition without operating under favorable conditions.

It should be pointed out that, while the most convenient way to integrate nose pattern recognition technology to mobile devices would obviously be to make the best use out of the native camera module on a given mobile device, the possibility of adding a specialized camera module more fit for biometric photography should not be ruled out. For instance, some mobile devices now come with a specialized camera comprising an infrared filter for human iris recognition.

A high quality biometric image should be in focus and have minimal occlusions by reflections from the surface moisture or other foreign substances or objects (including stray hair). In FIG. 1, (a) shows an out of focus nose pattern image; (b) shows a nose pattern image with specular reflection; and (c) shows a nose pattern image with occlusion by hair covering some of the nose. It should also have minimal angular distortions—i.e. frontal images—since the curved three-dimensional nature of the nose form can cause less accurate matching when two images are taken from extremely disparate angles. In FIG. 1, (d) shows a nose pattern image captured askew, thus resulting in angular distortion; and (e) shows a rotated nose pattern image. For the best matching results ideally the image quality should be consistent, with the only "variable" being the nose patterns themselves. However, contextual variables such as ambient light, stray lights from the surroundings, and even wind result in obstructive elements like bright reflections and facial hairs in the nose images; while an uncooperative animal or its sudden movements may result in images that are out of focus or taken from an extreme angle.

There are essentially two ways in which to acquire high quality images with minimal distortions and occlusions to the nose pattern: pre-capture adjustments and post-capture adjustments.

Figure 2:
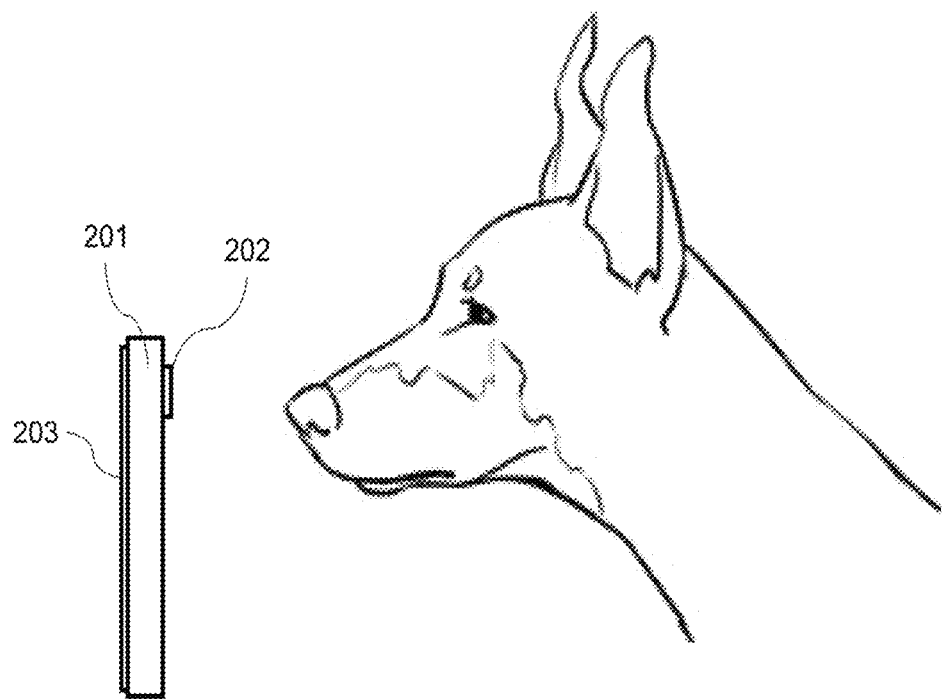
FIG. 2 illustrates capturing animal nose pattern images with a mobile device.

The present invention proposes a mobile device application for capturing animal nose pattern images with an embedded camera 202 on the mobile device 201, as illustrated in FIG. 2, wherein the biometric image quality of the image as seen in the capture screen 203 (i.e. phone screen) is evaluated in real-time based on several criteria, and if necessary the operator is given specific prompts to make pre-capture adjustments—such as removing moisture or foreign objects from the nose surface, changing the capture angle, changing the lighting, etc. Then, once images deemed to be adequate (i.e. pass a certain threshold) are acquired, they may be modified and enhanced to improve image quality.

Figure 3:
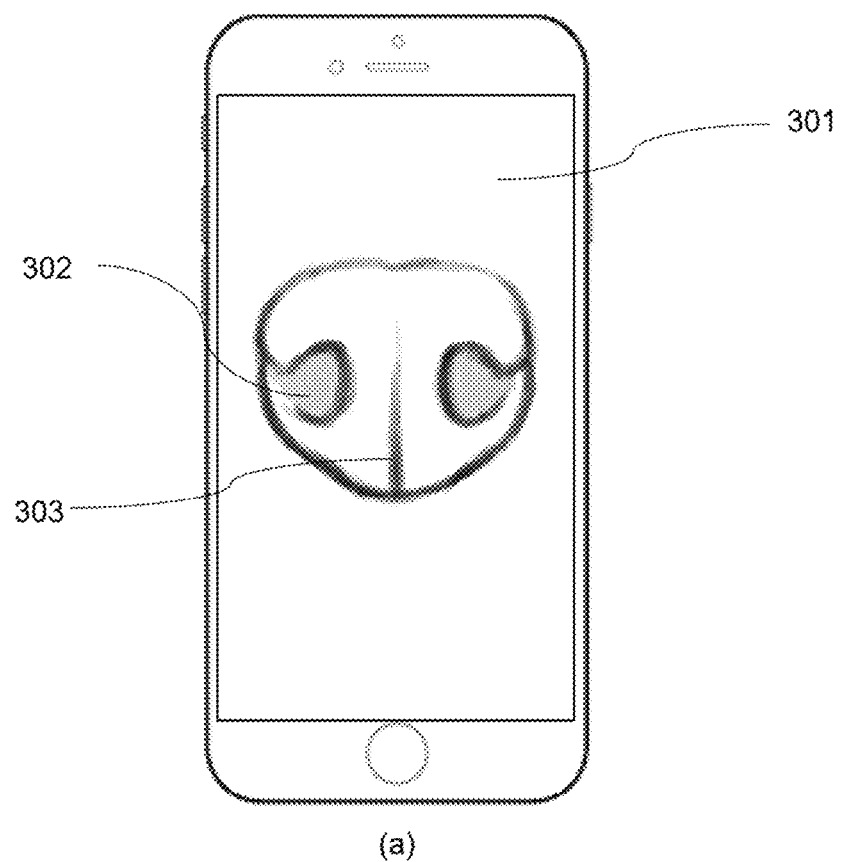
FIG. 3 illustrates examples of visual guides.
Figure 3:
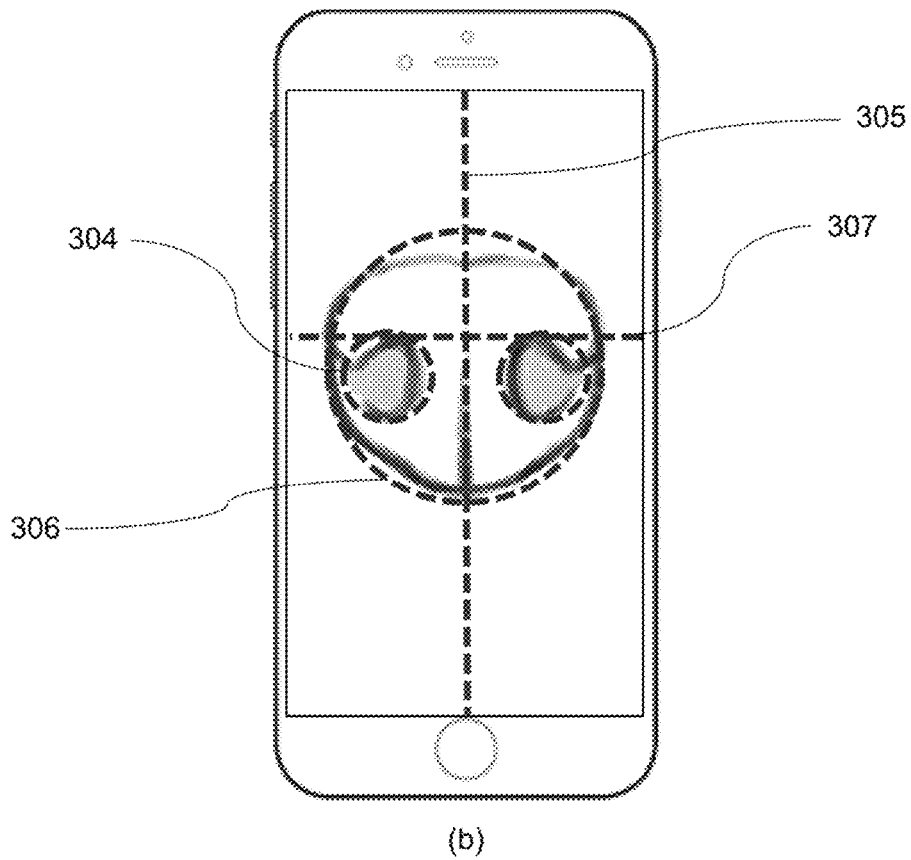

The core concept of this application involves the use "visual guides" for the placement of the nose on the capture screen 301. Visual guides help qualitatively and quantitatively assess image quality by appearing on the mobile device capture screen as shapes or lines that are meant to approximate the shape and/or location of certain features of the nose—such as the nostrils 302, philtrum 303, and the perimeter of the nose—on the capture screen, and he/she is to position the mobile device camera in relation to the nose so that particular features of the subject animal's nose overlap with the shapes and/or lines on the screen as closely as possible. As illustrated in FIG. 3, examples of visual guides include the nostril type visual guide 304, philtrum type visual guide 305, perimeter type visual guide 306, and horizontal type visual guide 307, as well as any combination thereof.

The visual guides may also be used for autofocus area selection. Instead of the operator manually selecting the focus target—for example by tapping an area on the capture screen—the visual guides determine where the autofocus area should be.

Moreover, the visual guides are used to define which regions, or sampling areas, of the image as seen on the capture screen are evaluated real-time for image quality, in order to instruct the operator to make adjustments to improve image quality if necessary. While the real-time image quality assessment may use the entire image, it is faster and more efficient to evaluate a sampling area, wherein the sampling area is a portion of the image used as a representative of the whole. The visual guides may assist in selecting the sampling area by defining the sampling area. For example, when the horizontal type guide and philtrum type guide are selected—where the horizontal type guide is meant to be tangent to the tops, or bottoms, of the two nostrils, and the philtrum type guide is meant to lie on top of the philtrum—the live image quality assessment can be set to occur at the region where the two guides intersect. As the size of the nose or of the individual features (like nostrils) and the distance between certain features (like the two nostrils) vary from one individual animal to another— especially between animals of different species, breeds, or sizes—the size and position of visual guides can be adjusted to accommodate the subject animal. For instance, the visual guides used for one nose may have nostril type guides that are twice as big in size and half the distance away from each other, compared to the visual guides used for another nose.

Another role of the visual guides is to help define the ROI of the biometric image, which is the area within the image that is used for biometric identification. The ROI may cover the same area as the sampling area, but for practical reasons the sampling area could generally be smaller, for high-speed live image quality assessment.

Figure 4:
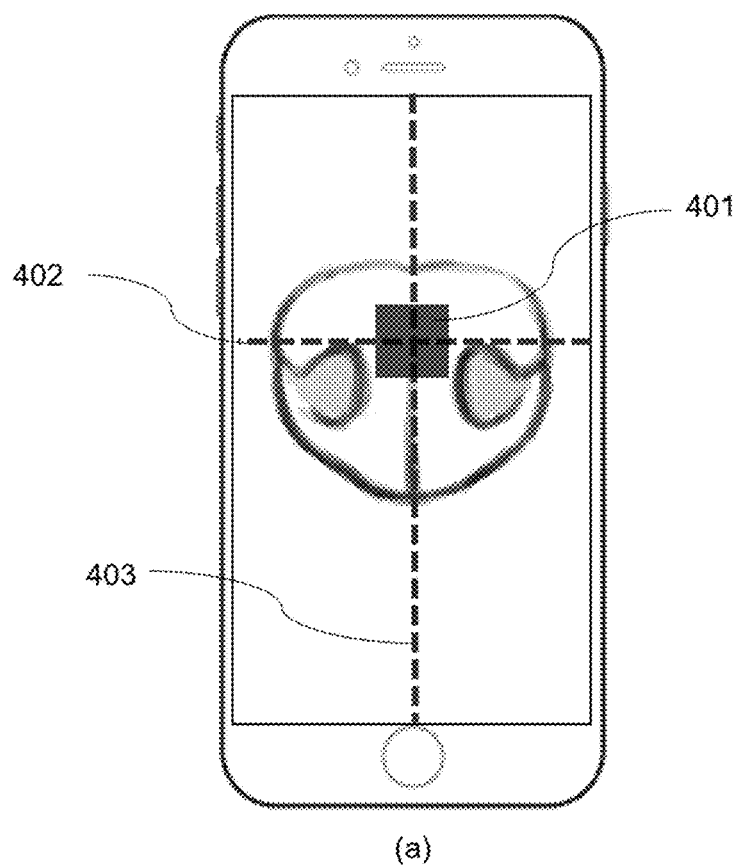
FIG. 4 illustrates examples of Region of Interest (ROI) that can be defined using visual guides.
Figure 4:
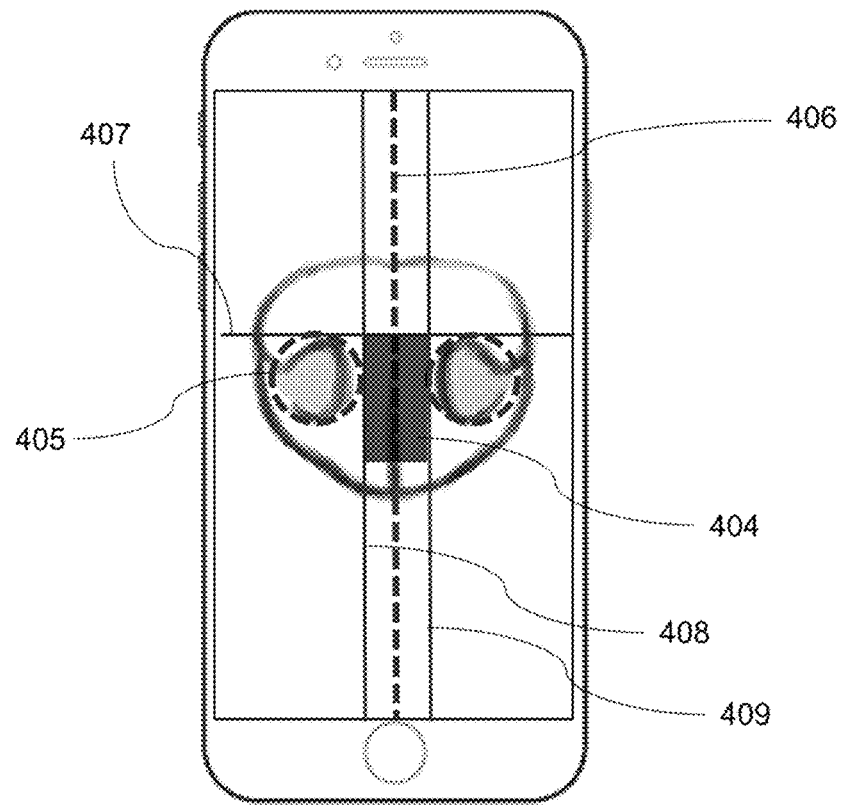

Those animals that have biometrically identifiable nose prints have patterning that cover some to most of the outer surface of the nose. All or some segment of the patterned area can be set as the ROI to be used in biometric identification. For instance, dogs have nose patterns that cover most of the outer nose surface, which means that the potential area for ROI on the whole nose is proportionately large compared to some other animals that have useful patterns only in the area between the nostrils. By superimposing the visual guides on the mobile device capture screen over the subject animal's nose, the user is implicitly setting some parameters of the ROI. For example, as illustrated in (a) of FIG. 4, when the horizontal type visual guide 402 and philtrum type visual guide 403 are selected, the ROI 401 could be a square or circle of a particular size with the intersection of the two guides as the center. In FIG. 4, (b) illustrates an example of an ROI 404 obtained using the nostril type visual guide 405 and philtrum type guide 406, wherein the rectangular area is bounded by a line 407 tangent to the top of the nostril type visual guides and lines 408, 409 parallel to the philtrum type visual guide set on the inner boundary of the nostril type visual guides.

The main assessment criteria we use to determine nose pattern image quality is focus measure, specular reflection index, occlusion index, and angular distortion index.

The sharpness of the nose pattern image or of the ROI within the image is determined by calculating the focus measure.

Let us call 'I' the ROI in a given nose pattern image, then the focus measure for determining the sharpness in ROI I may be calculated using a variety of methods based on:
1. The gradient value at each point in the image;
2. The Laplacian value at each point in the image;
3. The Wavelet transform of the image;
4. The statistical characteristics of the image;
5. Discrete Cosine Transform; and
6. Others.

One example of such a calculation based on the Laplacian value of the image is as follows.

Let $\Delta I$ be a Laplacian image obtained by convolution of the matrix I, denoting the image of the ROI in grayscale, with Laplacian filter $$M = \frac{1}{6}\begin{bmatrix} 1 & 4 & 1 \\ 4 & -20 & 1 \\ 1 & 4 & 1 \end{bmatrix}$$

The focus measure is calculated as follows.

$$\frac{1}{mn}\sum_{i=1}^{m}\sum_{j=1}^{n}\Delta I(i, j)^2$$

The larger the value, the higher the sharpness of the ROI.

Calculating the specular reflection index is useful for evaluating animal nose pattern images because they may exhibit various specular reflections due to the moisture on the nose surface. Severe specular reflections can cause errors in nose recognition. It is therefore necessary to acquire animal nose images without such light reflections, or to eliminate them post-acquisition.

In order to acquire images without specular reflections or to remove them from already acquired images, it is necessary to first determine whether there are reflections in the image and, if so, where.

Various thresholding methods are commonly used to determine the presence and location of light reflections in still or moving images. In addition to the threshold method, Deep learning and Machine learning could be utilized to achieve the same.

The threshold value method determines that, in a given image, the pixels that have values satisfying the threshold conditions are specular reflection pixels. A threshold condition may comprise not only whether a value is above or below the threshold value, but also a composite of a wide range of different thresholds.

In the case of grayscale images, the threshold method is applied using the gray intensity level value of each pixel. In the case of color images, the threshold method is applied after converting to grayscale, or after decomposing into various channels such as RGB, HSV, YUV, etc. and setting threshold conditions for each channel. The threshold value may be a predetermined value or may be determined differently each time depending on the given image by analyzing its characteristics.

In the process of determining the presence and location of specular reflection, histogram equalization, contrast equalization, or other processes may be applied to pre-process the image to standardize the image; or to eliminate falsely selected reflection pixels in post-processing.

The likelihood of nose biometric identification error increases when the occlusion index is high, meaning when a nose is covered with hair or other foreign matters. In other words, to increase the accuracy of animal nose pattern recognition, it is important to acquire images without occlusion by foreign matters. Therefore, a method for determining whether or not some area of the nose in a given nose pattern image (both pre- and post-capture) is covered by hair or other substances is necessary.

The texture of animal nose surface has characteristics different from those of the texture of animal hair. Based on these properties, one may determine whether an area of the nose is occluded by other matters. Texture analysis methods for images include edge distribution analysis, Local Binary Pattern analysis, Co-occurrence matrix analysis, autocorrelation analysis, using the power spectrum on the Fourier Transform of the images, and the Laws texture energy calculation. Using these methods, it is possible to determine whether the ROI is occluded by something with features different from those of the nose itself.

In addition to texture analysis, Deep Learning and Machine Learning may also be used to distinguish nose patterns from occlusive foreign matters in a nose pattern image.

Calculating the angular distortion index of images can be useful for collecting nose pattern images that are captured from similar angles, which inherently makes comparing curved three-dimensional forms like animals noses easier and more accurate.

The simplest and surest way of consistently capturing the standard frontal angle of the nose is by visually evaluating the proportionality of the image on the capture screen prior to and during image acquisition. In other words, that both the left and right nostrils appearing on the capture screen are roughly the same size, and that the philtrum is positioned generally forward and vertical are visual indications that the relative position of the camera to the nose is front and center.

To facilitate this process, the present invention proposes the use of visual guides that appear as overlays on the capture screen so that the user may position the camera relative to the nose where specific guides overlap with the corresponding features of the nose. Such features may include the nostrils and philtrum, as well as the outer boundaries of the nose.

All of this is not to say that the front and center angle is the only useful angle for nose pattern matching. There are certainly usable patterns present on the periphery of the nose. However, as mentioned earlier the animal nose is 3-dimensional and curved, which means some images taken from one extreme angle may not show at all the side of the nose taken from another extreme angle. For example if one nose pattern image, taken from the right side at a right angle to the direction the animal's face is towards, is to be matched against another image, taken from the left side at a right angle to the direction the animal's face is towards, then there may not be any or enough common region for the matching to occur. That the front and center angle is preferred is simply to set a nose pattern image capturing standard, where there are the most identifiable features—such as the nostrils and philtrum—to visually estimate the angle, so as to maximize the probability that any two given candidate images for matching may contain common regions on the nose.

In summary, the point of this application pre-capture is to provide visual guides to minimize operator/human error, while identifying "bad images" live.

Prior to image acquisition when the user is aiming the mobile device camera at the subject's nose, if the focus measure, specular reflection index, occlusion index, and/or angular distortion index within the ROI is outside the threshold of the tolerated range, then the mobile application may alert the user of such, and recommend action based on the live assessment. A uni-variate threshold for any one of the measurements of focus, specular reflection index, occlusion index, and angular distortion index may be used; or a multi-variate threshold of some combination thereof. Here it should be noted that the threshold or acceptable range of values for any of the said assessment criteria is highly flexible depending such matters as the calculation method for each index; the tolerance level of the biometric identification algorithm for imperfections in nose pattern images; a favorable measure in one criterion compensating for an unfavorable measure in another criterion where a multi-variate threshold is used; etc.

For example, the action prompt may tell the user to move closer or further away from the subject nose in order to come within the focus range of the camera when the focus measure is outside a chosen tolerated range.

Or, if specular reflection is the assessment criterion, the prompt may comprise moving closer or further away from the subject nose in order to change the intensity of ambient lighting; modifying the lighting environment (i.e. turn lights on or off, or move indoors or outdoors, etc.) or changing the angle at which ambient light hits the subject nose; and removing moisture or foreign matters present on the nose surface.

If the assessment criterion is angular distortion, the prompt may ask the user to change the angle at which the mobile device camera is pointing at the subject animal nose when the angular distortion index is higher than a chosen threshold.

Likewise, if the assessment criterion is occlusion, the prompt may ask the user to remove foreign matters present on the nose surface when the occlusion index is higher than a chosen threshold.

Moreover, a multi-variate threshold that combines more than one criterion may be used to assess the image quality, wherein if the image does not satisfy the threshold, then the user is prompted to execute at least two from the following set of actions: moving the mobile device camera closer or further away from the subject nose; changing intensity of ambient lighting; changing type of ambient lighting; changing angle at which the ambient light hits the subject nose; removing moisture from the nose surface; removing foreign matters present on the nose surface; and changing the angle at which the mobile device camera is pointing at the subject nose.

The capturing of the nose pattern images may be done automatically once the image quality in the ROI is within the chosen uni- or multi-variate threshold, or manually. In other words, when the user is pointing the mobile device camera at the subject animal nose using the designated nose pattern capturing application, the quality of the image as seen on the device preview screen is assessed live, and may be programmed to start image acquisition automatically when the conditions are met, or simply prompt the user to start capture.

Once images of quality beyond a set threshold are acquired, then the post-capture processing step can take place. The processing step may comprise at least one from the group consisting of: selecting the best image among the captures images; enhancing the selected best image; enrolling or matching the selected image with nose pattern images in a database; generating a nose code from the best image; enrolling or matching the generated nose code with nose codes in the database.

The image acquisition process may comprise a single image capture at a time or a stream capture, wherein a plurality of frames are captured consecutively during a given timeframe. With the single image capture, if the image quality threshold is not met, then the user may be given a prompt to re-do the capture. With the stream capture, the image quality of all of the images in the stream are calculated; the images that satisfy the threshold are selected; and the image with the highest score out of those that satisfy the threshold is selected. If no image from a stream satisfies the threshold, then the user may be given a prompt to re-do the capture.

Likewise with a stream capture, the processing step may comprise at least one from the group consisting of: selecting the best image among the captures images; enhancing the selected best image; enrolling or matching the selected image with nose pattern images in a database; generating a nose code from the best image; enrolling or matching the generated nose code with nose codes in the database.

The first task in image enhancements may be to rotate the image if the captured image is tilted. For example, if the axis of the philtrum in the image is not vertically oriented, then the image could be rotated to make it so.

The next task could be to remove specular reflections from the image. If the nose pattern region is damaged by specular reflection in a given nose pattern image, it is possible to recover the damaged parts by using various methods of inpainting. The first step is masking the region with specular reflection. When a specific damaged region is identified with the mask, then the damaged area can be recovered relatively naturally through various methods including the following algorithms.

1. Bertalmio, Marcelo, Andrea L. Bertozzi, and Guillermo Sapiro. "Navier-stokes, fluid dynamics, and image and video inpainting." In Computer Vision and Pattern Recognition, 2001. CVPR 2001. Proceedings of the 2001 IEEE Computer Society Conference on, vol. 1, pp. 1-355. IEEE, 2001.

2. Telea, Alexandru. "An image inpainting technique based on the fast marching method." Journal of graphics tools 9.1 (2004): 23-34.

Further image enhancing steps may be undertaken as necessary, including adjustments to the sharpness, brightness, and contrast levels.

It should be noted that any part of the image quality assessment calculations during pre-capture as well as post-capture image selection, image enhancement and further processing may occur on the local mobile device, or on the cloud server.

A nose pattern image (with or without the post-capture enhancements) may be stored and used for matching as is, as images, or be used to generate "nose codes" that contain the biometric data from the acquired nose pattern image. This template generation step may occur on the local mobile device (i.e. using the mobile device CPU) or on the cloud server.

Moreover, the nose pattern image or nose code may be stored on the local mobile device and/or a dedicated cloud server for subsequent enrollment or matching. The matching algorithm (for identification and verification) may likewise be located in the local mobile device application or on the cloud server.

An embodiment of the present invention may be implemented in a computer system including a computer-readable recording medium. The computer system may include one ore more processors, memory, a user-interface input device, a user-interface output device, and storage, which communicate with each other via a bus. Also, the computer system may further include a network interface that is connected to a network. The processor may be a central processing unit or a semiconductor device for executing processing instructions stored in the memory or the storage. The memory and the storage may be various types of volatile or nonvolatile storage media. For example, the memory may include ROM or RAM.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

While the embodiments of the present disclosure and their advantages have been described in detail, it should be understood that various changes, substitutions and alterations may be made herein without departing from the scope of the present disclosure.

What is claimed is:

1. A method for implementing animal nose pattern biometric identification system on a mobile device, the method comprising:
   aiming an embedded camera on the mobile device at the nose using visual guides displayed on a screen of the mobile device;
   imposing the visual guides on the screen over a perimeter of the nose or features of the nose displayed on the screen through the camera; and
   capturing resulting animal nose pattern images with the camera,
   wherein the visual guides are used to acquire good quality nose pattern images for biometric identification.

2. The method of claim 1, further comprising evaluating image quality in real time by taking a sample area to be a representative of the whole image, wherein the sample area is gotten by using the visual guides.

3. The method of claim 2, further comprising the assessment criteria being at least one from the group consisting of focus measure, specular reflection index, occlusion index, and angular distortion index.

4. The method of claim 3, wherein the assessment criterion is the focus measure.

5. The method of claim 4, further comprising giving a prompt to a user to move the mobile device camera closer or further away from the subject nose when the focus measure is outside a tolerated range.

6. The method of claim 3, wherein the assessment criterion is the specular reflection index.

7. The method of claim 6, further comprising giving a prompt to a user to do at least one of:
   changing intensity of ambient lighting;
   changing type of ambient lighting;
   changing angle at which the ambient light hits the subject nose; and
   removing moisture from the nose surface,
   wherein the specular reflection index is higher than a chosen threshold.

8. The method of claim 3, wherein the assessment criterion is the occlusion index.

9. The method of claim 8, further comprising giving a prompt to a user to remove foreign matters present on the nose surface when the occlusion index is higher than a chosen threshold.

10. The method of claim 3, wherein the assessment criterion is the angular distortion index.

11. The method of claim 10, further comprising giving a prompt to a user to change the angle at which the mobile device camera is pointing at the subject nose when the angular distortion index is higher than a chosen threshold.

12. The method of claim 3, further comprising assessing the image quality using more than one criterion simultaneously, wherein if the image does not satisfy a multi-variate threshold that combines said used criteria, then a user is prompted to execute at least two of:
   moving the mobile device camera closer or further away from the subject nose;
   changing intensity of ambient lighting;
   changing type of ambient lighting;
   changing angle at which the ambient light hits the subject nose;
   removing moisture from the nose surface;
   removing foreign matters present on the nose surface; and
   changing the angle at which the mobile device camera is pointing at the subject nose.

13. The method of claim 1, wherein the visual guide is at least one from the group consisting of nostril type visual guide, philtrum type visual guide, perimeter type visual guide, and horizontal type visual guide.

14. The method of claim 13, further comprising using a combination of the nostril type visual guide and the philtrum type visual guide.

15. The method of claim 13, further comprising using the perimeter type visual guide.

16. The method of claim 1, further comprising changing the visual guides in size and position to fit the nose of a subject animal of a particular species, breed or size of the animal.

17. The method of claim 1, further comprising capturing the nose pattern images in a stream, wherein consecutive frames of images are captured within a given timeframe.

18. The method of claim 1, further comprising establishing boundaries of region of interest (ROI) for nose pattern recognition utilizing the visual guides, wherein the ROI is an area within the image that is used for biometric identification.

19. The method of claim 1, further comprising at least one of:
   selecting a best image among the captured images;
   enhancing the selected image;
   matching the selected image with nose pattern images in a database;
   generating a nose code from the nose pattern image; and
   matching the nose code with nose codes in the database.

20. The method of claim 17, further comprising at least one of:
   selecting a best image among the captured images;
   enhancing the selected image;
   matching the selected image with nose pattern images in a database;
   generating a nose code from the nose pattern image; and
   matching the nose code with nose codes in the database.

* * * * *